(12) United States Patent
Baldwin et al.

(10) Patent No.: US 9,010,813 B1
(45) Date of Patent: Apr. 21, 2015

(54) WEATHERPROOF CONDUIT COUPLER

(75) Inventors: Jeffrey P. Baldwin, Phoenix, AZ (US); Jimmy Wade, Tempe, AZ (US); Brad Fulghum, Chandler Heights, AZ (US)

(73) Assignee: Hubbell Incorporated, Shelton, CT (US)

( * ) Notice: Subject to any disclaimer, the term of this patent is extended or adjusted under 35 U.S.C. 154(b) by 1255 days.

(21) Appl. No.: 12/337,440

(22) Filed: Dec. 17, 2008

Related U.S. Application Data

(60) Provisional application No. 61/014,140, filed on Dec. 17, 2007.

(51) Int. Cl.
*F16L 37/00* (2006.01)
*F16L 37/14* (2006.01)

(52) U.S. Cl.
CPC ....................................... *F16L 37/14* (2013.01)

(58) Field of Classification Search
USPC ......... 285/242, 244, 257, 258, 304, 305, 313, 285/319, 403; 24/458
See application file for complete search history.

(56) References Cited

U.S. PATENT DOCUMENTS

| | | | |
|---|---|---|---|
| 4,190,222 A | | 2/1980 | Appleton et al. |
| 4,919,462 A | * | 4/1990 | Matsui et al. ............... 285/149.1 |
| 5,132,493 A | | 7/1992 | Sheehan |
| 5,401,063 A | * | 3/1995 | Plosz .............................. 285/81 |
| 6,293,596 B1 | * | 9/2001 | Kinder .......................... 285/305 |
| 6,860,758 B1 | | 3/2005 | Kiely |
| 7,211,744 B2 | | 5/2007 | Jorgensen |
| 2008/0277922 A1 | * | 11/2008 | Ghidini .......................... 285/34 |

* cited by examiner

*Primary Examiner* — Daniel P Stodola
*Assistant Examiner* — Gwendolyn Driggers
(74) *Attorney, Agent, or Firm* — Michael Best & Friedrich, LLP

(57) ABSTRACT

Particular implementations of an electrical conduit coupling comprise a coupler body having an open end defined by an outer body wall. The open end comprises an interior diameter sized and shaped to accept a cylindrical conduit. A raised shoulder portion extends inward from an inside surface of the coupler body. A locking element in the outer body wall comprises a locking tab recess. The locking element comprises a compression plate, a locking tab, and a release. The compression plate is slidably engaged with the outer body wall and extends past the inside surface of the coupler body to engage an outer wall of the conduit. The locking tab extends into the locking tab recess when the compression plate is in its engaged position. Upon actuation of the release, the locking tab withdraws from the locking tab recess and the compression plate slides to an unengaged position.

14 Claims, 6 Drawing Sheets

WEATHERPROOF CONDUIT COUPLER

CROSS REFERENCE TO RELATED APPLICATIONS

This document claims the benefit of the filing date of U.S. Provisional Patent Application 61/014,140 to Baldwin, et al. entitled "Weatherproof Conduit Coupler," which was filed on Dec. 17, 2007, the disclosure of which is hereby incorporated herein by reference.

BACKGROUND

1. Technical Field

Aspects of this document relate generally to weatherproof coupling devices for conduits.

2. Background Art

Coupling devices for conduits are useful in the construction and electrical trades to join two conduits in an end-to-end orientation. Other types of coupling devices join an end of a conduit with an electrical junction box. Various types of coupling devices have been attempted, including, by way of non-limiting example, cementable sleeve couplers, fusion couplers that meld adjoining pipe ends, compression couplers, and others. Conventional pipe couplers also exist that comprise a rotatable screw to engage a side of a conduit to hold the conduit into a coupler.

SUMMARY

Aspects of this document relate to coupling devices for conduits.

In one aspect, an electrical conduit coupling comprises a coupler body having an open end defined by an outer body wall, the open end having an interior diameter sized and shaped to accept insertion of a cylindrical conduit. A raised shoulder is situated within the coupler body, which extends inwardly from an inside surface of the coupler body. The raised shoulder is positioned to abut the cylindrical conduit at a stopped position within the coupler body. an opening through the outer body wall. A locking element is disposed in the opening through the outer body wall. In addition, the outer body wall comprises a locking tab recess. The locking element comprises a compression plate, a locking tab, and a release. The compression plate is slidably engaged with the outer body wall and extends past the inside surface of the coupler body to engage an outer wall of the cylindrical conduit. The locking tab extends into the locking tab recess when the compression plate is moved to its engaged position. Upon actuation of the release, the locking tab withdraws from the locking tab recess and the compression plate slides with respect to the opening to a unengaged position.

Particular implementations may include one or more of the following. An annular groove may be disposed about the inside surface of the coupler body between the raised shoulder and the opening through the outer body wall. An annular gasket may be seated in the annular groove such that the gasket contacts the outer wall of the cylindrical conduit in its stopped position. The outer body wall may comprise a wedge angled toward the raised shoulder such that the compression plate is supported by the wedge in the engaged position. The opening through the outer body wall may further comprises an angled slot in communication with the locking tab recess such that when the locking tab withdraws from the locking tab recess, the locking tab slides along the angled slot until the locking element is in its unengaged position. The open end may comprise a first open end and the conduit body may further comprise a second open end. The second open end may comprise an outer surface, an inner surface, and a helical threaded connection arranged to accept a threaded connection disposed about one of the outer surface and the inner surface. The release may comprise a pair of outwardly biased squeeze tabs which, when manually moved inward against a bias, may cause the locking tab to withdraw. The compression plate may comprise a v shaped notch sized and shaped to straddle an outer surface of the cylindrical conduit. The compression plate may comprise a pivot bar compression plate suspended on an axis pin.

In another aspect, an electrical conduit coupling comprises a coupler body having an inside surface and an open end defined by an outer body wall. The open end comprises an interior diameter sized and shaped to accept insertion of a cylindrical conduit. An annular groove is disposed about the inside surface of the coupler body and an annular gasket is seated in the annular groove such that the gasket is in communication with an outer wall of a distal end of the cylindrical conduit when the cylindrical conduit is in its stopped position. The outer body wall comprises an opening therethrough and a locking element is disposed in the opening through the outer body wall. The locking element comprises a compression plate that is slidably engaged with the outer body wall and extends past the inside surface of the coupler body to engage an outer wall of the cylindrical conduit.

Particular implementations may include one or more of the following. The outer body wall may comprise a wedge angled toward the distal end of the cylindrical conduit in its stopped position. The opening through the outer body wall may further comprise an angled slot in communication with a locking tab and locking tab recess such that when the locking tab withdraws from the locking tab recess, the locking tab slides along the angled recess until the locking element is in its unengaged position. The locking element may further comprise a release, wherein upon actuation of the release, a locking tab withdraws from a locking tab recess and the compression plate slides with respect to the opening to an unengaged position. The open end may comprise a first open end. The conduit body may further comprise a second open end having an outer surface, an inner surface, and a helical threaded connection arranged to accept a threaded connection disposed about one of the outer surface and the inner surface. The compression plate may comprise a v shaped notch sized and shaped to straddle the outer surface of the cylindrical conduit. The compression plate may comprise a pivot bar compression plate suspended on an axis pin.

In still another aspect, an electrical conduit coupling comprises a coupler body having an inside surface and an open end defined by an outer body wall. The open end comprises an interior diameter sized and shaped to accept insertion of a cylindrical conduit. An annular groove is disposed about the inside surface of the coupler body. An annular gasket is seated in the annular groove such that the gasket is in communication with the outer wall of a distal end of the cylindrical conduit when the cylindrical conduit is in its stopped position. The outer body wall comprises an opening therethrough. A locking element is disposed in the opening through the outer body wall, the outer body wall comprising a locking tab recess. The locking element comprises a compression plate, a locking tab, and a release. The compression plate is slidably engaged with the outer body wall and extends past the inside surface of the coupler body to engage an outer wall of the cylindrical conduit. The locking tab extends into the locking tab recess when the compression plate is moved to its engaged position and, upon actuation of the release, the locking tab withdraws from the locking tab recess and the compression plate slides with respect to the opening to a unengaged position.

Particular implementations may include one or more of the following. The opening through the outer body wall may further comprise an angled slot in communication with the locking tab recess such that when the locking tab withdraws from the locking tab recess, the slides along the angled recess until the locking element is in its unengaged position. The release may comprises a pair of outwardly biased squeeze tabs which, when manually moved inward against a bias, may cause the locking tab to withdraw. The compression plate may comprises a v shaped notch sized and shaped to straddle an outer surface of the cylindrical conduit. The compression plate may comprises a pivot bar compression plate suspended on an axis pin and slidably engaged with the outer body wall.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A weatherproof coupling device for conduits will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation of an electrical conduit coupling and/or assembly procedures for an electrical conduit coupling will become apparent for use with implementations of electrical conduit couplings from this disclosure. Accordingly, for example, although particular coupler bodies, open ends, outer body walls, interior diameters, cylindrical conduits, raised shoulders, inside surfaces, openings, locking tab recesses, locking elements, compression plates, locking tabs, releases, annular grooves, annular gaskets, wedges, angled slots, second open ends, helical threaded connections, outwardly biased squeeze tabs, v-shaped notches, pivot bars, and axis pins are disclosed, such coupler bodies, locking elements, compression plates, locking tabs, releases, annular grooves, annular gaskets, and implementing components may comprise any shape, size, style, type, model, version, measurement, concentration, material, quantity, and/or the like as is known in the art for such electrical conduit couplings consistent with the intended operation of an electrical conduit coupling.

Figure 1:
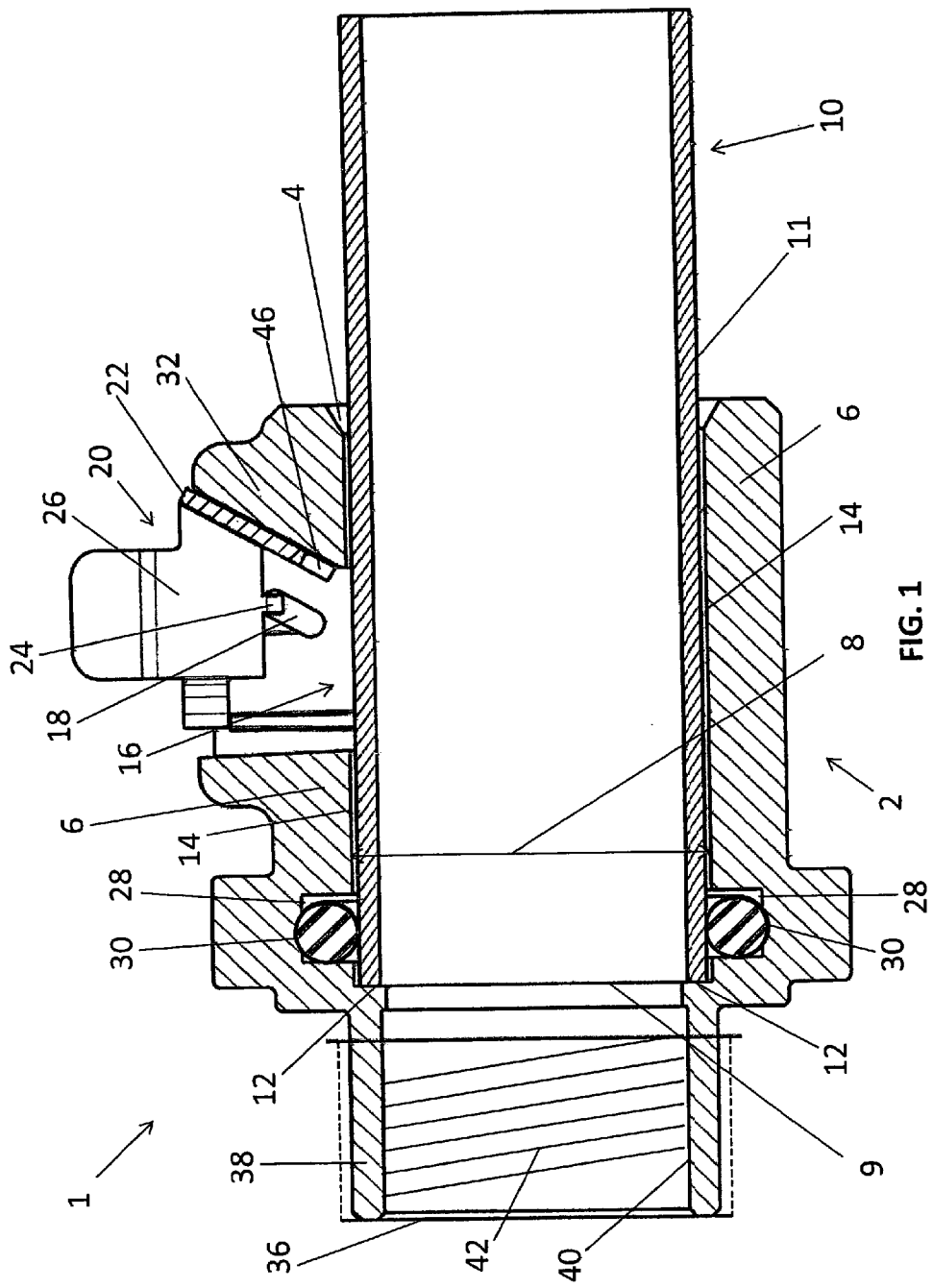
FIG. 1 illustrates a side cut-away view of an electrical conduit coupling with a compression plate in an unengaged position with respect to a cylindrical conduit.
Figure 2:
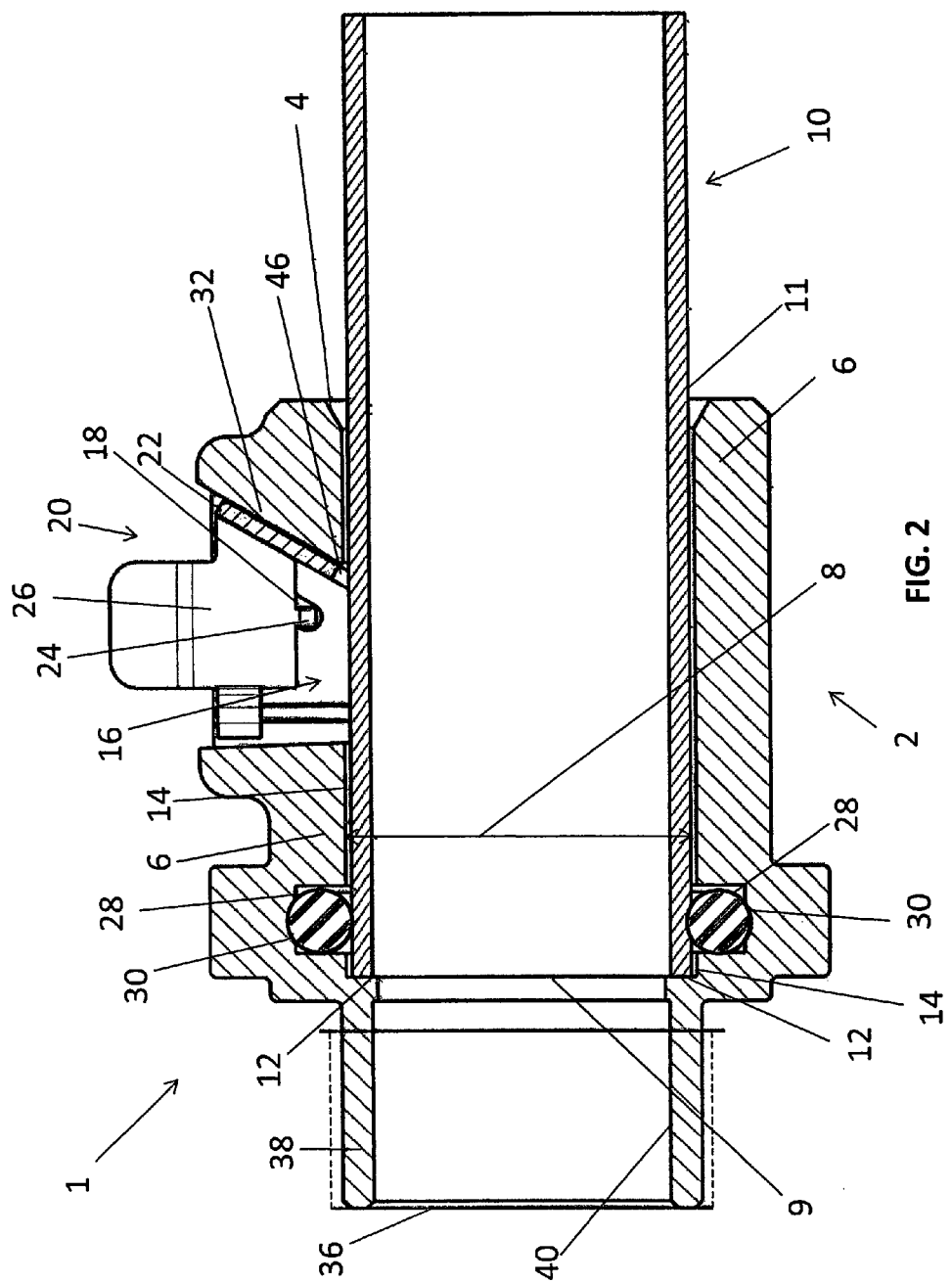
FIG. 2 illustrates a side cut-away view of an electrical conduit coupling with a compression plate in an engaged position with respect to a cylindrical conduit

There are a variety of possible electrical conduit coupling implementations. FIGS. 1 and 2, illustrate a side cut-away view of an electrical conduit coupling 1 with compression plate 22 in an unengaged position and an engaged position, respectively. Coupler body 2 comprises open end 4, which is defined by outer body wall 6. Open end 4 comprises interior diameter 8, which is sized and shaped to accept insertion of cylindrical conduit 10. Coupler body 2 also comprises inside surface 14, against which cylindrical conduit 10 slides snugly when inserted. In particular implementations, coupler body 2 may comprise raised shoulder 12 which extends inwardly from inside surface 14 of coupler body 2. Raised shoulder 12 may comprise a continuous ridge about inside surface 14, or raised shoulder 12 may comprise one or more discontinuous protrusions or projections disposed on inside surface 14. As illustrated, raised shoulder 12 is positioned to abut an end of cylindrical conduit 10 when cylindrical conduit 10 is at a stopped position (as illustrated in FIGS. 1 and 2). Notwithstanding, in those particular implementations not comprising raised shoulder 12, cylindrical conduit 10 may be in a stopped position when distal end 9 passes through annular gasket 30 and cylindrical conduit 10 is held in place with respect to coupler body 2 via locking element 20.

Still referring to FIGS. 1-2, coupler body 2 further comprises opening 16 through outer body wall 6. In addition, outer body wall 6 further comprises one or more locking tab recesses 34. Disposed in opening 16 is locking element 20, which, in this particular implementation, comprises compression plate 22, locking tab 24, and release 26. An installer desiring to couple cylindrical conduit 10 with coupler body 2 may first insert cylindrical conduit 10 into open end 4 of coupler body 2. As described further below, compression plate 22 is slidably engageable with outer body wall 6 such that when compression plate 22 is moved to its engaged position (FIG. 2), compression plate 22 extends past inside surface 14 to engage outer wall 11 of cylindrical conduit 10. In particular implementations, compression plate 22 may comprise v-shaped notch 46 at the end of compression plate 22 that is closest cylindrical conduit 10, v-shaped notch 46 being sized and shaped to straddle outer surface 11 of cylindrical conduit 10. Specifically, when compression plate 22 is engaged, the "v" shape of compression plate 22 straddles outer wall 11 and presses against it. In particular, the "v" shape of compression plate 22 pressing against outer wall 11 "bites" into the surface of outer wall 11 and restricts the movement of cylindrical conduit 10 with respect to coupler body 2.

A comparison of FIG. 1 to FIG. 2 illustrates the difference in position of compression plate 22 when compression plate 22 is in its unengaged position and engaged position, respectively. In particular, FIG. 1 illustrates compression plate 22 in an unengaged position, such that compression plate 22 does not contact outer surface 11 of cylindrical conduit 10. With compression plate 22 in its unengaged position, cylindrical conduit 10 may slide in and out of open end 4 unimpeded by the impingement of compression plate 22 upon outer surface 11 of cylindrical conduit 10. By contrast, in FIG. 2 compression plate 22 is illustrated in its engaged position with respect to outer surface 11 of cylindrical conduit 10. With compression plate 22 in its engaged position, compression plate 22 extends past inside surface 14 of coupler body 2 and engages outer surface 11 of cylindrical conduit 10. Specifically, with compression plate 22 engaging outer surface 11 of cylindrical conduit 10, compression plate 22 contacts and "bites" outer surface 11 such that the movement of cylindrical conduit 10 is resisted with respect to coupler body 2.

In addition, a comparison of FIG. 1 to FIG. 2 further illustrates that when compression plate 22 is engaged, locking tab 24 extends into locking tab recess 34 (FIGS. 3-5) such that compression plate 22 is maintained in its engaged position through the mechanical communication of locking tab 24 and locking tab recess 34. In this particular implementation, locking tab recess 34 extends through outer body wall 6, but in many implementations locking tab recess 34 will not extend through outer body wall 6, but will simply be a recess. In addition, in some particular implementations, opening 16 further comprises angled slot 18, which may be in communication with locking tab recess 34 such that when locking tab 24 withdraws from locking tab recess 34, locking tab 24 slides along angled recess 18 until locking element 20 is in its unengaged position. In some particular implementations, outer body wall 6 further comprises wedge 32 which may be angled toward either raised shoulder 12 (in those particular implementations comprising raised shoulder 12), or toward distal end 9 of cylindrical conduit 10 when cylindrical conduit 10 is in its stopped position with respect to coupler body 2.

As illustrated in FIG. 1, upon actuation of release 26, locking tab 24 withdraws from locking tab recess 34 and compression plate 22 slides with respect to opening 16 to the unengaged position (so that compression plate 22 is removed from contact with outer wall 11 of cylindrical conduit 10). Accordingly, in particular implementations, when release 26 disengages the compression plate 22, the entire locking element 20, including compression plate 22, locking tab 24 and release 26 may travel upward (along the surface of wedge 32, in particular implementations) and away from outer wall 11 of cylindrical conduit 10. It will be appreciated that the surface force between compression plate 22 and wedge 32 is lessened as compression plate 22 moves away from the lowered, engaged position.

In those instances where an installer needs to release cylindrical conduit 10 from coupler body 2, the installer may actuate release 26, in the implementation shown by squeezing outwardly biased squeeze tabs 44, to release compression plate 22 from its engaged position, to allow compression plate 22 to move away from outer wall 11, thereby releasing cylindrical conduit 10 with respect to coupler body 2. Thus, it will be appreciated that cylindrical conduit 10 is releasably engaged with the coupler body 2. It will be further appreciated that locking element 20 does not require the use of any tools to engage or disengage a coupling between coupler body 2 and cylindrical conduit 10. In addition, other configurations of locking element 20 may be used. For example, different locking elements 20 may be employed and different shapes and/or structures for engaging outer wall 11 of cylindrical conduit 10 with locking element 20 may be utilized such as, by way of non-limiting example, pivot bar 48 (illustrated in FIG. 6).

In some particular implementations, release 26 may comprise a pair of outwardly biased squeeze tabs 44 (FIG. 5) which, when manually moved inward against a bias, cause locking tab 24 to withdraw from locking tab recess 34.

Still referring to FIG. 1, some particular implementations of an electrical conduit coupling may further comprise annular groove 28 disposed about inside surface 14 of coupler body 2. Annular gasket 30 may be seated and held in place in annular groove 28 such that annular gasket 30 contacts outer wall 11 of cylindrical conduit 10 when cylindrical conduit 10 is in its stopped position with respect to coupler body 2. Annular gasket 30 may comprise any gasket material interposed between inside surface 14 and outer wall 11 to provide a weather-resistant (although not necessarily waterproof in all implementations) seal when coupler body 2 is in communication with cylindrical conduit 10. By way of non-limiting example, annular gasket 30 may comprise an elastomeric material such as rubber or silicone. In those particular implementations comprising raised shoulder 12, annular groove 28 may be disposed about inside surface 14 of coupler body 2 between the raised shoulder 12 and opening 16. In those particular implementations that do not comprise raised shoulder 12, annular groove 28 may be disposed about inside surface 14 of coupler body 2 between opening 16 and distal end 9 of cylindrical conduit 10, when cylindrical conduit 10 is in its stopped position with respect to coupler body 2. In addition, conduit body 2 may further comprise second open end 36 which comprises outer surface 38, inner surface 40 and helical threaded connection 42 configured to accept a threaded connection disposed about one or both of outer surface 38 and inner surface 40.

Figure 3:
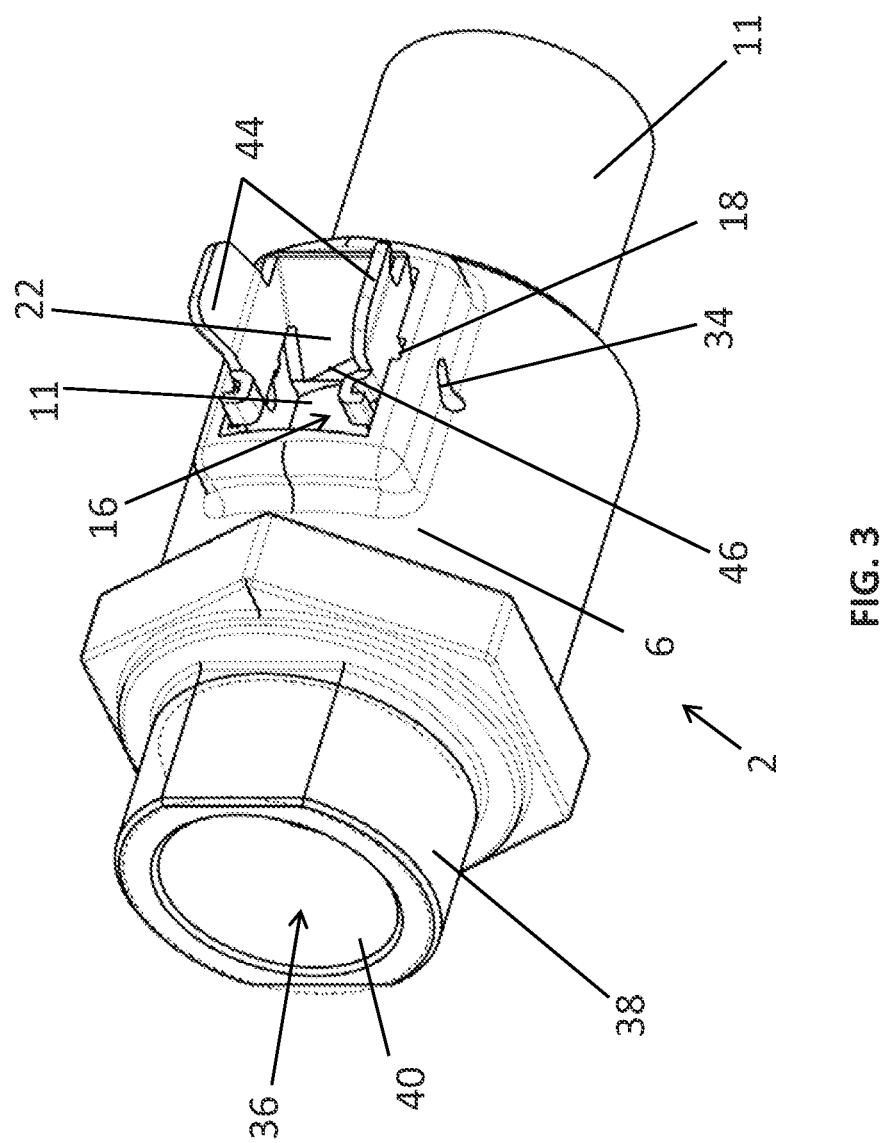
FIG. 3 illustrates a perspective view of an electrical conduit coupling with a compression plate in an unengaged position with respect to a cylindrical conduit.
Figure 4:
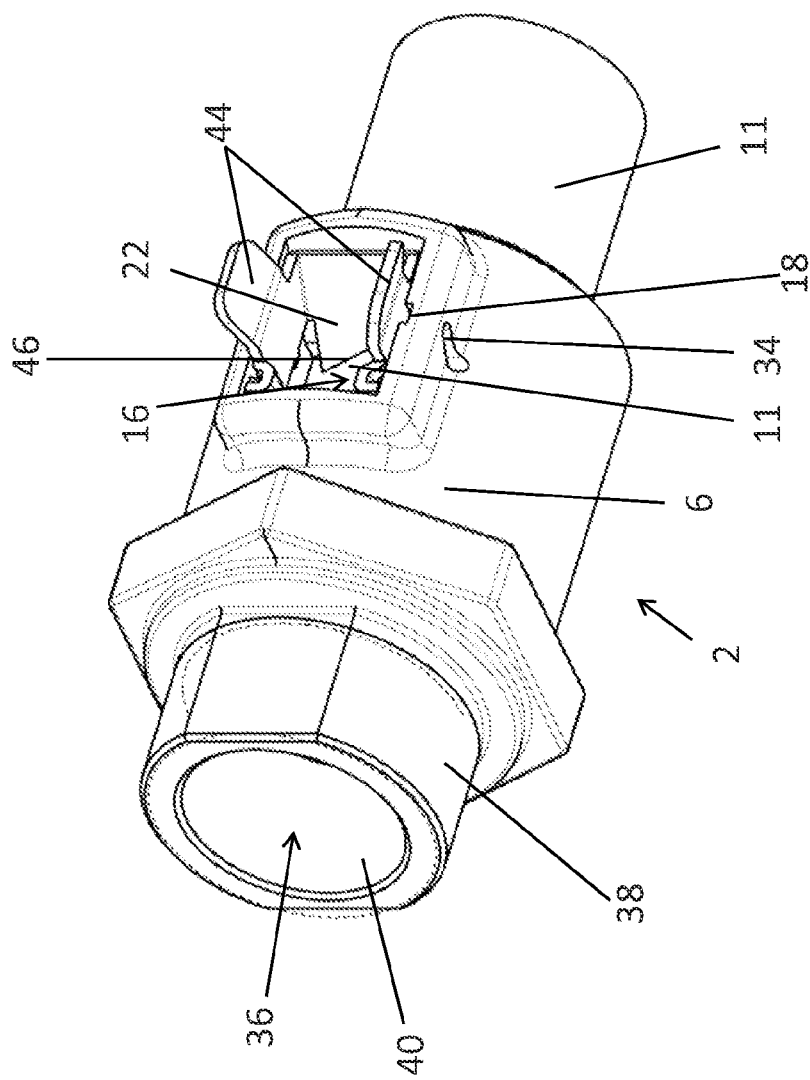
FIG. 4 illustrates a perspective view of an electrical conduit coupling with a compression plate in an unengaged position with respect to a cylindrical conduit.

Referring now to FIGS. 3 and 4, these figures illustrate perspective views of an electrical conduit coupling having a compression plate in an unengaged position and an engaged position, respectively. In particular, FIG. 3 illustrates compression plate 22 in its unengaged position, wherein compression plate 22 does not engage outer wall 11 of cylindrical conduit 10. With compression plate 22 in its unengaged position, locking tab 24 is withdrawn from locking tab recess 34. By contrast, FIG. 4 illustrates compression plate 22 in its engaged position, wherein compression plate 22 engages outer wall 11 of cylindrical conduit 10. With compression plate 22 in its engaged position, locking tab 24 extends into locking tab recess 34 such that compression plate 22 is maintained in its engaged position through the mechanical communication of locking tab 24 and locking tab recess 34. It will be understood that moving compression plate 22 to its engaged position comprises moving locking tab 24 into locking tab recess 34 such that compression plate 22 is maintained in its engaged position through the mechanical communication of locking tab 24 and locking tab recess 34. Throughout compression plate 22's movement between its engaged position and unengaged positions, locking tab 24 follows angled recess 18. An installer may removably couple cylindrical conduit 10 with coupler body 10 without the requirement of tools.

Figure 5:
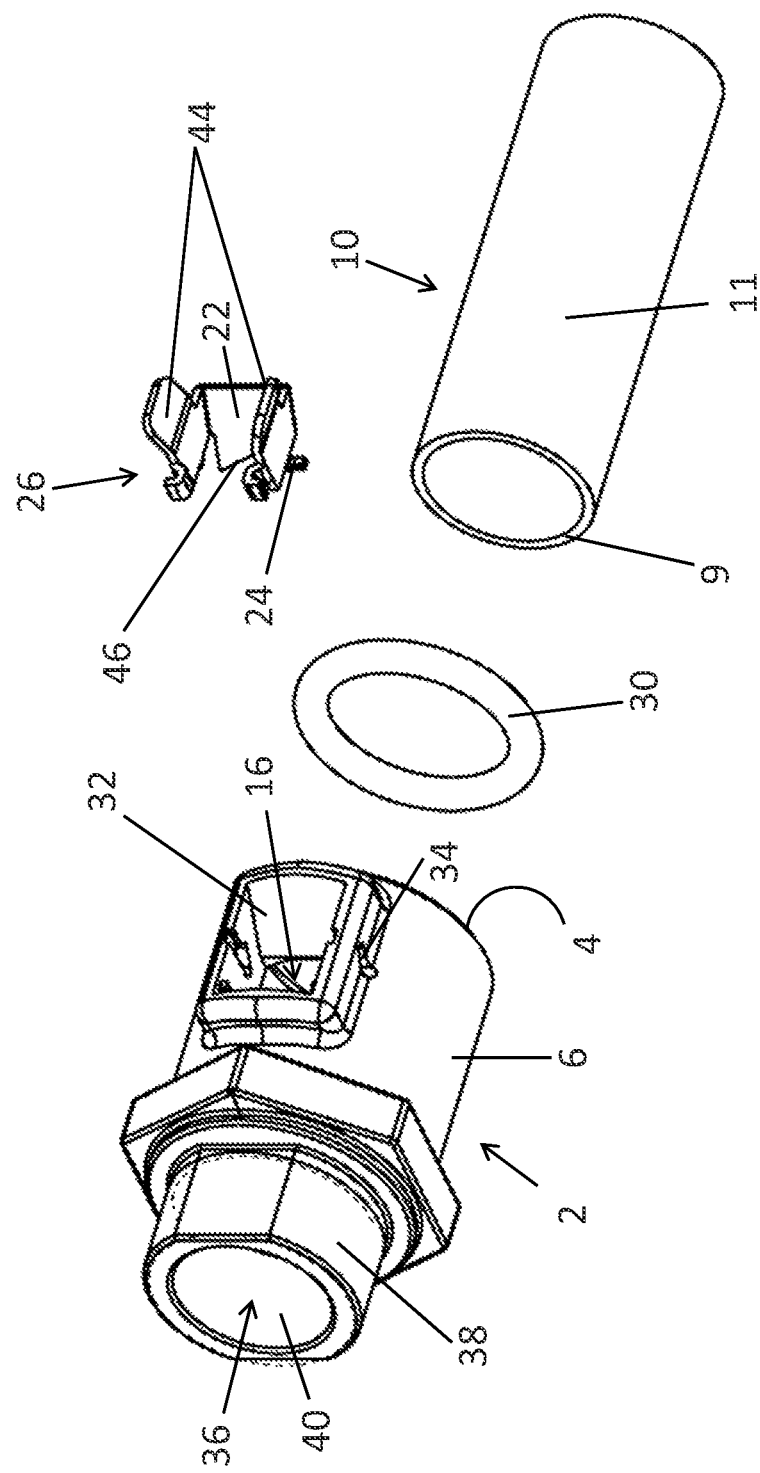
FIG. 5 illustrates an exploded perspective view of an electrical conduit coupling and cylindrical conduit.

Referring now to FIG. 5, this figure illustrates an exploded perspective view of an electrical conduit coupling and cylindrical conduit. As noted above, in particular implementations, annular gasket 30 and annular groove 28 (FIG. 1) may be provided Annular gasket 30 may be seated in annular groove 28 such that annular gasket 30 makes contact with outer wall 11 of cylindrical conduit 10 when cylindrical conduit is in its stopped position (FIGS. 1 and 2). In addition, as noted above, in some particular implementations, release 26 may comprise a pair of outwardly biased squeeze tabs 44. Specifically, in some particular implementations, compression plate 22 is disposed between a pair of outwardly biased squeeze tabs 44, with the junction between each of the pair of outwardly biased squeeze tabs 44 with the compression plate 22 forming a flexure with an outward bias to press at least one locking tab 24 into locking tab recess 34 in the engaged position of compression plate 22 and maintain locking tab 24 into angled recess 18 throughout movement between the engaged position and unengaged position.

Figure 6:
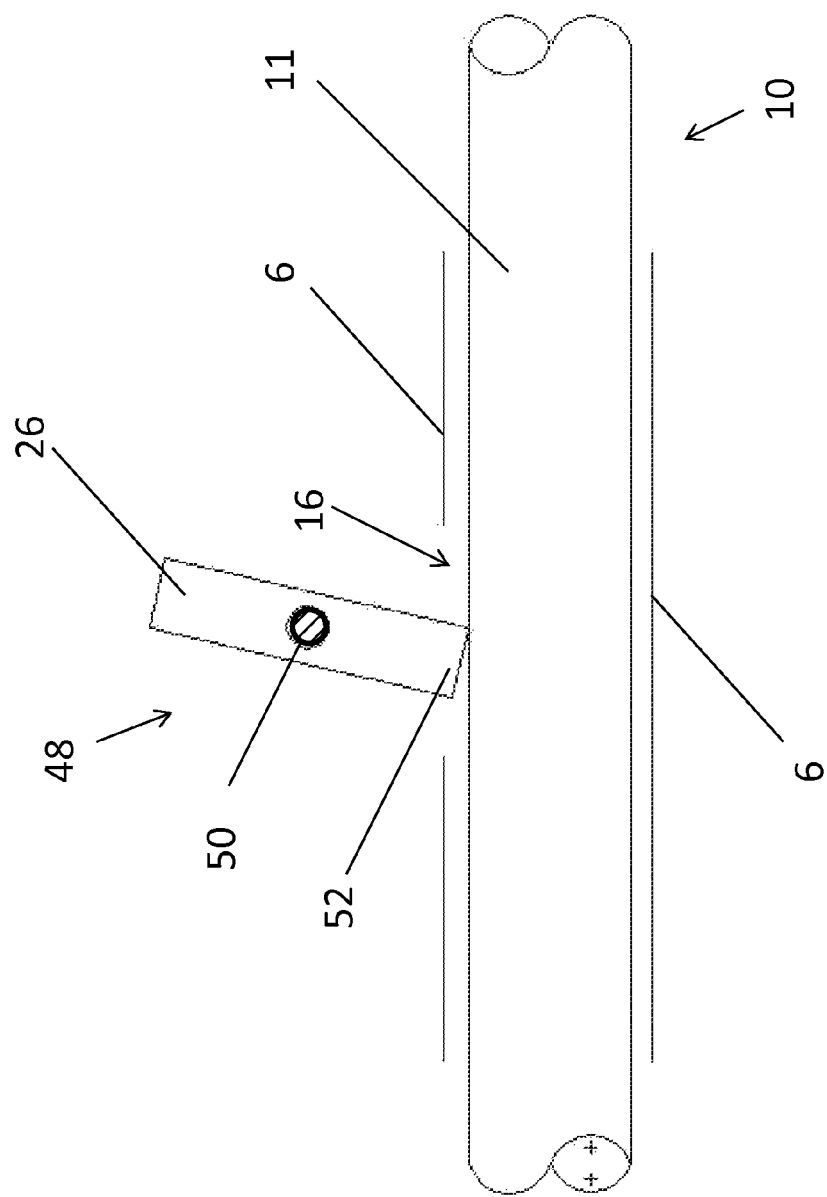
FIG. 6 is a schematic diagram of another exemplary embodiment of a locking element.

FIG. 6 illustrates an alternative implementation of a locking element for substitution into the compression plate configuration of previous implementations. In this implementation, the compression plate comprises pivot bar compression plate 48 which is suspended within opening 16 via axis pin 50. Where previous implementations showed locking tabs 24 and squeeze tabs 44 coupled through the compression plate, the present implementation would include the locking tabs 24 and squeeze tabs 44 coupled together at or near the pivot structure for the pivot bar so that similar release mechanisms and structures can be used.

In the particular implementation shown in FIG. 6, pivot bar compression plate 48 is formed longer on its lower end (the distance between axis pin 50 and engagement portion 52) than the distance between outer surface 11 and axis pin 50, so that pivot bar compression plate 48 cannot stand upright (i.e. at a 90° angle with respect to outer wall 11) when pivot bar compression plate 48 is engaged with respect to outer wall 11. Consequently, when cylindrical conduit 10 is pushed into coupler body 2 (not shown), pivot bar compression plate 48 pivots out of engagement, allowing cylindrical conduit 10 to move into coupler body 2 as far as it is pushed. By contrast, if cylindrical conduit 10 is moved in the direction which would tend to pull cylindrical conduit 10 back out of coupler body 2, then friction rotates pivot bar compression plate 48 such that pivot bar compression plate 48 (which is too long to stand up straight with respect to cylindrical conduit 10) bites into outer wall 11 of cylindrical conduit 10, thereby resisting cylindrical conduit 10 from being removed from coupler body 2. A user wishing to disengage pivot bar compression plate 48 with respect to outer wall 11 may disengage compression plate 48 in this implementation similar to disengaging compression plate 22 from previous implementations, but squeezing squeeze tabs 44 to release locking tabs 24 from engagement with locking tab recesses 34 to allow locking tabs 24 to travel along angled recess 18 (see FIGS. 1-3). When locking tabs 24 release and compression plate 48 is moved to an unengaged position, the rotate release 26 and associated engagement portion 52 of compression plate 48 disengages with respect to outer wall 11.

It will be understood by those of ordinary skill in the art that the concepts of using coupler bodies and locking elements to join two conduits end-to-end and/or one or more conduits with an electrical junction box, as disclosed herein, are not limited to outdoor conduits or to the specific implementations shown herein. For example, it is specifically contemplated that the components included in a particular implementation of an electrical conduit coupling may be formed of any of many different types of materials or combinations that can readily be formed into shaped objects and that are consistent with the intended operation of an electrical conduit coupling. For example, the components may be formed of: metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; wood, or the like; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as fiberglass), carbon-fiber, aramid-fiber, any combination thereof, and/or other like materials; composites and/or other like materials; any other suitable material; and/or any combination of the foregoing.

Furthermore, the coupler bodies, raised shoulders, locking elements, annular gaskets, cylindrical conduits any other components forming a particular implementation of an electrical conduit coupling may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with mechanical cooperation, adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for an electrical conduit coupling may be utilized. Accordingly, for example, although coupler bodies, locking elements, annular gaskets, and other components may be disclosed, such components may comprise any shape, size, style, type, model, version, class, grade, measurement, concentration, material, weight, quantity, and/or the like consistent with the intended operation of a method and/or system implementation for an electrical conduit coupling may be used.

In places where the description above refers to particular implementations of an electrical conduit coupling, it should be readily apparent that a number of modifications may be made without departing from the spirit thereof and that these implementations may be applied to other electrical conduit couplings. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical conduit coupling comprising:
 a coupler body comprising
  an open end defined by an outer body wall, the open end having an inside surface with an interior diameter sized and shaped to accept insertion of a cylindrical conduit;
  a raised shoulder within the coupler body and extending inward from an inside surface of the coupler body, the raised shoulder positioned to abut the cylindrical conduit at a stopped position within the coupler body; and
  an opening through the outer body wall comprising a wedge wall at an acute angle relative to a longitudinal center axis of the inside surface of the coupler body; and
  an annular groove disposed about the inside surface of the coupler body between the raised shoulder and the opening through the outer body wall; and
  an annular gasket seated in the annular groove such that the gasket is sized and shaped to contact an outer wall of the cylindrical conduit in a stopped position; and
 a locking element disposed in the opening through the outer body wall, the outer body wall comprising a locking tab recess, the locking element comprising a substantially planar compression plate extending at an acute angle relative to the center axis of the inside surface, a locking tab, and a release, wherein the compression plate is slidably engaged with the wedge wall of the outer body wall and extends substantially parallel to the wedge wall past the inside surface of the coupler body to engage the cylindrical conduit at an acute angle and the locking tab extends into the locking tab recess when the compression plate is moved to an engaged position, wherein the release comprises a pair of outwardly biased squeeze tabs extending longitudinally from the compression plate and extending radially outwardly from the opening which, when manually moved inward against a bias, cause the locking tab to withdraw from the locking tab recess, and the compression plate slides with respect to the opening to an unengaged position.

2. The electrical conduit coupling of claim 1, wherein the wedge wall and the compression plate are angled toward the raised shoulder, and the compression plate is supported by the wedge wall in the engaged position.

3. The electrical conduit coupling of claim 1, wherein the opening through the outer body wall further comprises an angled slot in communication with the locking tab recess such that when the locking tab withdraws from the locking tab recess, the locking tab slides along the angled slot until the locking element is in the unengaged position.

4. The electrical conduit coupling of claim 1, wherein the open end comprises a first open end, the conduit body further comprising a second open end comprising an outer surface, an inner surface, a helical threaded connection disposed about one of the outer surface and the inner surface arranged to accept a threaded connection.

5. The electrical conduit coupling of claim 1, wherein the compression plate comprises a v-shaped notch sized and shaped to straddle an outer surface of the cylindrical conduit.

6. An electrical conduit coupling comprising:
a coupler body comprising
an inside surface;
an open end defined by an outer body wall, the open end having an inside surface with an interior diameter sized and shaped to accept insertion of a cylindrical conduit;
an annular groove disposed about the inside surface of the coupler body, wherein
an annular gasket is seated in the annular groove such that the gasket is sized and shaped to communicate with an outer wall of a distal end of the cylindrical conduit when the cylindrical conduit is in a stopped position;
an opening through the outer body wall comprising a wedge wall at an acute angle relative to a longitudinal center axis of the inside surface of the coupler body; and
a locking element disposed in the opening through the outer body wall, the locking element comprising a planar compression plate slidably engaged with the wedge wall of the outer body wall and extending at an acute angle substantially parallel to the wedge wall past the inside surface of the coupler body to engage the outer wall of the cylindrical conduit at the acute angle, a locking tab, and a release, wherein the release comprises a pair of outwardly biased squeeze tabs extending longitudinally from the compression plate and extending radially outwardly from the opening which, when manually moved inward against a bias, cause the locking tab to withdraw from the locking tab recess, and the compression plate slide with respect to the opening to an unengaged position.

7. The electrical conduit coupling of claim 6, wherein the wedge wall and the compression plate are angled toward the distal end of the cylindrical conduit in the stopped position.

8. The electrical conduit coupling of claim 6, wherein the opening through the outer body wall further comprises an angled slot in communication with the locking tab and the locking tab recess such that when the locking tab withdraws from the locking tab recess, the locking tab slides along the angled recess until the locking element is in the unengaged position.

9. The electrical conduit coupling of claim 6, wherein the open end comprises a first open end, and the conduit body further comprises a second open end comprising an outer surface, an inner surface, a helical threaded connection disposed about one of the outer surface and the inner surface arranged to accept a threaded connection.

10. The electrical conduit coupling of claim 6, wherein the compression plate comprises a v-shaped notch sized and shaped to straddle the outer surface of the cylindrical conduit.

11. An electrical conduit coupling comprising:
a coupler body comprising
an inside surface;
an open end defined by an outer body wall, the open end having an inside surface with an interior diameter sized and shaped to accept insertion of a cylindrical conduit;
an annular groove disposed about the inside surface of the coupler body, wherein an annular gasket is seated in the annular groove such that the gasket is sized and shaped to communicate with an outer wall of a distal end of the cylindrical conduit when the cylindrical conduit is in a stopped position;
an opening through the outer body wall comprising a wedge wall at an acute angle relative to a longitudinal center axis of the inside surface of the coupler body; and
a locking element disposed in the opening through the outer body wall, the outer body wall comprising a locking tab recess, the locking element comprising a substantially planar compression plate extending at an acute angle relative to the center axis of the inside surface, a locking tab, and a release, wherein the compression plate is slidably engaged with the wedge wall of the outer body wall and extends parallel to the wedge wall past the inside surface of the coupler body to engage the outer wall of the cylindrical conduit at the acute angle and the locking tab extends into the locking tab recess when the compression plate is moved to an engaged position, wherein the release comprises a pair of outwardly biased squeeze tabs extending longitudinally from the compression plate and extending radially outwardly from the opening which, when manually moved inward against a bias, cause the locking tab to withdraw from the locking tab recess, and the compression plate slides with respect to the opening to an unengaged position.

12. The electrical conduit coupling of claim 11, wherein the opening through the outer body wall further comprises an angled slot in communication with the locking tab recess such that when the locking tab withdraws from the locking tab recess, the locking tab slides along the angled recess until the locking element is in the unengaged position.

13. The electrical conduit coupling of claim 11, wherein the compression plate comprises a v-shaped notch sized and shaped to straddle an outer surface of the cylindrical conduit.

14. The electrical conduit coupling of claim 11, wherein the compression plate has a major surface extending orthogonal to the center axis of the inside surface.

* * * * *